Aug. 11, 1970  E. GÖTZ ET AL  3,524,049
DIGITAL CURVE COMPUTER FOR MACHINE TOOL SYSTEMS
Filed Dec. 19, 1966  4 Sheets-Sheet 1

Elmar Götz
Peter Boese
Inventors
By: George K. Spencer
Attorney

United States Patent Office 3,524,049
Patented Aug. 11, 1970

3,524,049
DIGITAL CURVE COMPUTER FOR MACHINE TOOL SYSTEMS
Elmar Götz, NEU Isenburg, and Peter Boese, Berlin-Frohnau, Germany, assignors to Licentia Patent-Verwaltungs-G.m.b.H., Frankfurt am Main, Germany
Continuation-in-part of application Ser. No. 536,924, Mar. 23, 1966. This application Dec. 19, 1966, Ser. No. 607,126
Claims priority, application Germany, Apr. 25, 1961, L 38,807
Int. Cl. G06f 7/38, 15/46
U.S. Cl. 235—156
9 Claims

ABSTRACT OF THE DISCLOSURE

A computer for calculating the coordinates of a curve having rectilinear and/or circular curve portions. The frequency of the clock, and/or the computer constant, is adjusted depending on the length or radius of the curve portion so that the resolution of the computer calculations is independent of the length or radius of the curve portion being calculated.

CROSS-REFERENCES TO RELATED APPLICATIONS

This application is a continuation-in-part of copending application Ser. No. 536,924, filed Mar. 23 1966, now abandoned, which itself is a continuation of application Ser. No. 180,992, filed Mar. 20, 1962, now abandoned.

BACKGROUND OF THE INVENTION

The present invention, which relates to a digital computer, is directed to an improvement of the arrangement disclosed and claimed in the earlier filed and previously co-pending application Ser. No. 78,574, filed Dec. 27, 1960, by Heinz Günter Lott, Elmar Götz, and Peter Boese, now Pat. No. 3,109,092, dated Oct. 29, 1963. The arrangement of the earlier application involves a digitally operating computer which has the characteristic data of a curve, composed of rectilinear and/or circular portions, fed into it and continually computes points along the curve which are sufficiently close to each other to allow the curve to be followed. All of the positions of the digital number representing the coordinates $x_\nu$ and $y_\nu$ of a calculated point $P_\nu$ along the curve appear in synchronism and simultaneously at the output of the computer and, after a time interval depending on the clock pulse frequency $f_t$ at which the computer is set to operate, are replaced by the data pertaining to the next point along the curve. Such an arrangement may be used, for example, for controlling the path along which the tool of a machine tool moves with respect to a work piece, or the path along which the work piece is moved relative to the work tool.

SUMMARY OF THE INVENTION

The invention resides, basically, in an arrangement for rendering the resolution of the computer calculations independent of the length of rectilinear and the radius of circular curve portions being calculated and this is done by providing a variable-frequency clock for controlling the computer and/or means for adjusting the computer constant of the computer. Also provided are means for calculating, prior to the time a given curve portion is traversed, the length of such curve portion if it is rectilinear or the radius of such curve portion if it is circular. Also provided are means interconnecting the calculating means with the clock, if such clock be provided, and with the adjusting means, if such adjusting means be provided, for adjusting the computer constant, by respective factors which are inversely proportional to the length or radius, as the case may be, of the curve portion to be traversed.

DESCRIPTION OF THE PREFERRED EMBODIMENTS

Figure 1:
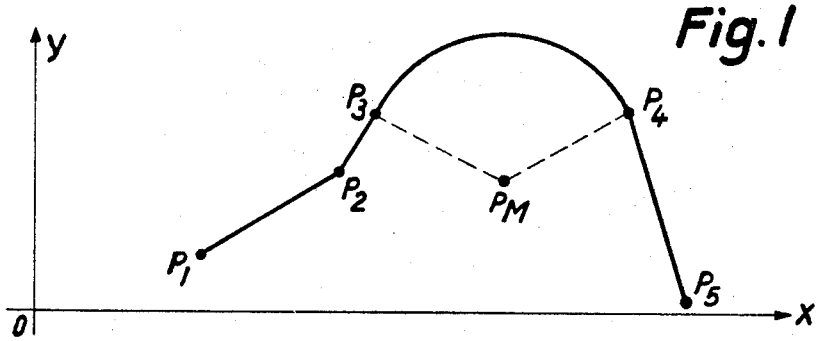
FIG. 1 is a plot of a curve whose coordinates are to be calculated by the computer.
Figure 2:
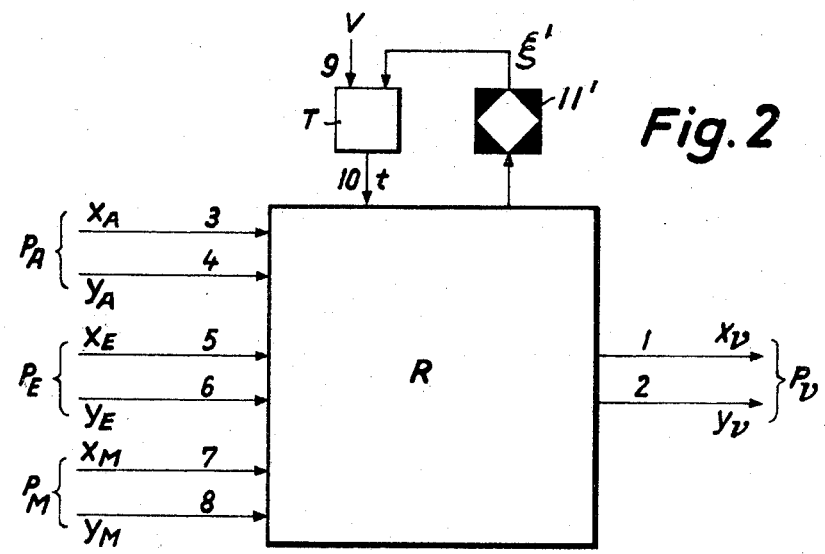
FIG. 2 is a schematic illustration of a computer incorporating the improvement according to the present invention.

The computer is able to compute the coordinates of points along a curve which is composed of rectilinear and circular arcuate portions, or a curve which can be approximated by such portions. Such a curve is shown in FIG. 1, whose characteristic data includes the starting and end points of the three rectilinear portions $P_1$–$P_2$, $P_2$–$P_3$, $P_4$–$P_5$, and the starting and end points as well as the center $P_M$ of the circular portion $P_3$–$P_4$. FIG. 2 shows the input and output of the schematically illustrated computer R. The characteristic curve data $P_A$, $P_E$ and $P_M$, of each particular curve portion is fed digitally into the computer in the form of the axial coordinates $x_A$, $y_A$, $x_E$, $y_E$, $x_M$, $y_M$ via inputs 3, 4, 5, 6, 7, 8, respectively. The coordinates $x_\nu$, $y_\nu$, of the calculated point $P_\nu$ appear, in digital form, at the outputs 1, 2, respectively. The computer is connected to a clock T which applies clock pulses $t$ to the computer at 10, thereby causing the computer to advance from one point $P_\nu$ to the next. The clock pulse frequency $f_t$ is adjusted, at 9, to be in accordance with the rate V at which the curve is to be traversed, this rate being, in the case of a machine tool control arrangement, the feed rate at which the tool and work piece move relative to each other. The component 11' will be discussed below.

Figure 2A:
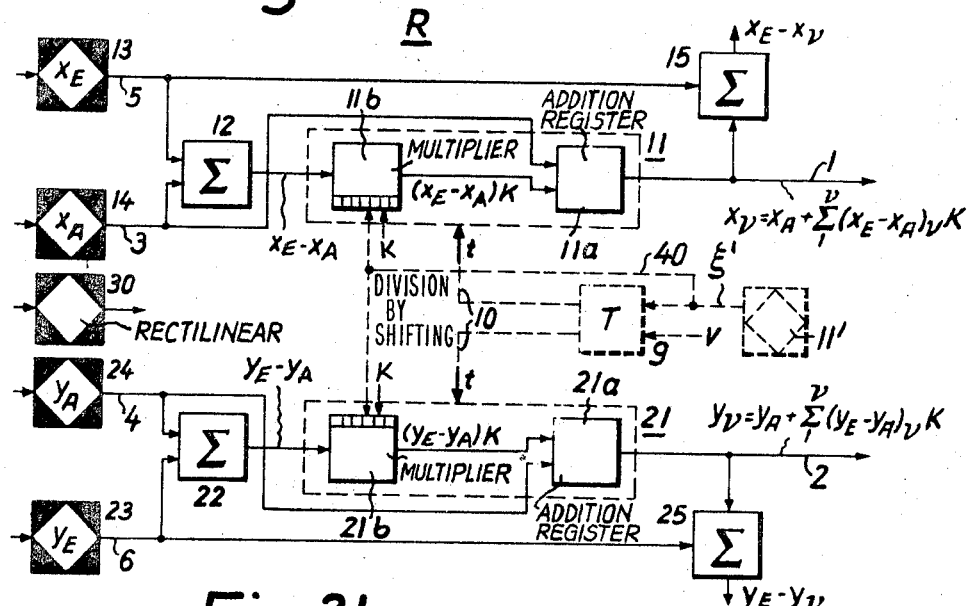
FIG. 2a shows how the computer disclosed in Pat. No. 3,109,092 may be connected for calculating a rectilinear portion.
Figure 2B:
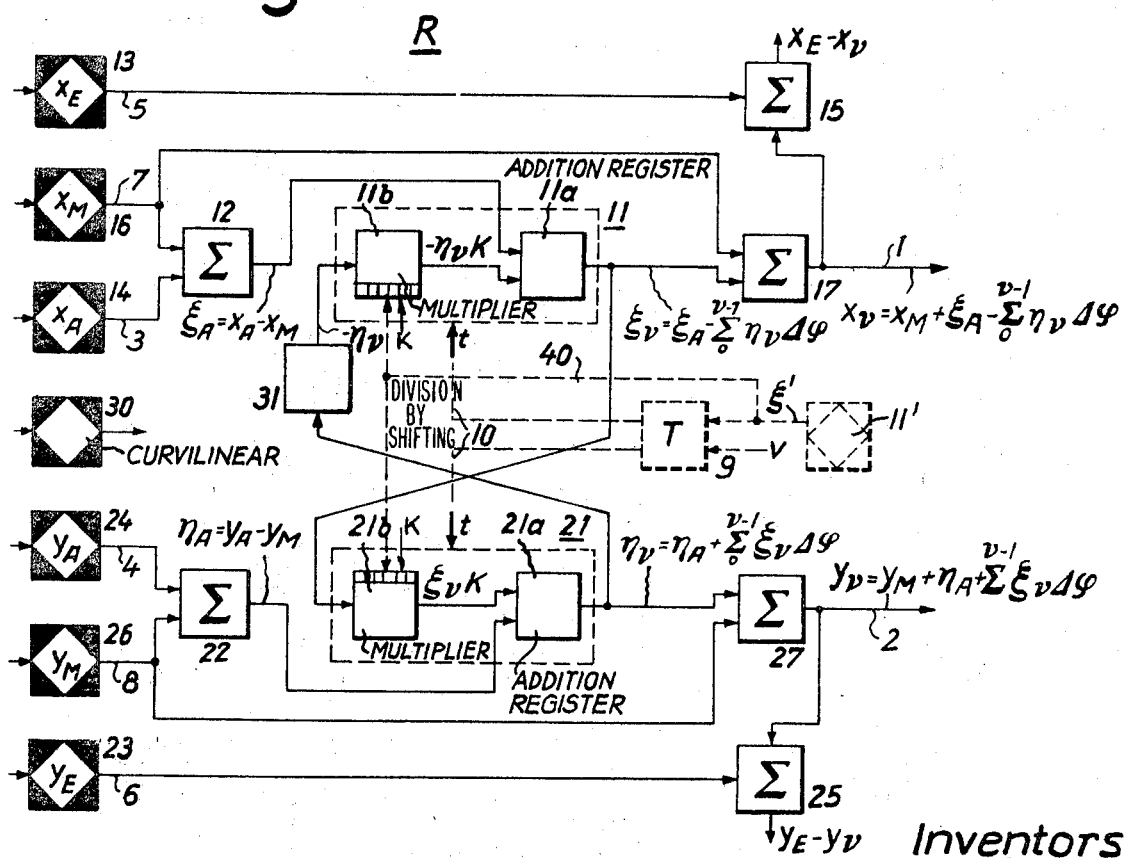
FIG. 2b shows how the computer disclosed in Pat. No. 3,109,092 may be connected for calculating a curvilinear portion.

FIGS. 2a and 2b show how the computer disclosed in Pat. No. 3,109,092 may be connected for calculating rectilinear and curvilinear portions, respectively. In each of these two figures, the components and lines shown in dashed lines are not utilized while the computer is switched to carrying out the particular operation.

When the computer is connected as shown in FIG. 2a, the characteristic data of the curve involved are applied to the multiple-digit digital stores 13, 14, 23, 24. The command "rectilinear" is applied, in digital form, to the digital store 30. The stores 14, 24 are given, in digital form the coordinates $X_A$, $Y_A$, of the starting point of the rectilinear portion and the stores 13, 23 are given in digital form the coordinates $X_E$, $Y_E$, of the end point. The values of the coordinates of the starting point $X_A$, $Y_A$, are applied to the addition registers 11a, 21a of the main computer components 11, 21. The computer further incorporates summation components 12, 22 in which the differences $(x_E - x_A)$ and $(y_E - y_A)$ are formed. The thus obtained values are applied to multipliers 11b, 21b of the main computer components 11, 21, respectively, which multiply the differences by the computer component K and store the result. The main computer components 11, 21 are clock pulsed by signals $t$. Whenever a clock pulse $t$ appears, the digital numbers stored in the multipliers 11b, 21b are added to the numbers already present in the addition registers 11a, 21a. The time intervals at which the main computer components 11, 21, are clock pulsed are adjustable, i.e., the pulse frequency of the computer is adjustable. Thus, after $1/K$ periods, the numbers which have come to be stored in the addition registers 11a, 21a must be equal to the digital values of the coordinates of the end point $x_E$, $y_E$.

The differences between the starting values of the computer and the coordinates of the end point of the rectilinear portion are formed in the summation components 15, 25. As soon as these differences $(x_E - x_\nu)$ and $(y_E - y_\nu)$ become zero, the end point of the rectilinear portion will have been reached, and the input stores will then take up the curve data for the next succeeding curve portion.

When the computer is connected as shown in FIG. 2b for the purpose of calculating a curvilinear portion, the incoming data is again applied to the input stores 13, 14, 23, 24, and the store 30 which will now have the command "curvilinear" applied to it. Additionally, the coordinates $x_M$, $y_M$, of the center of the curve are applied to the two input stores 16, 26. The other components used for carrying out the computation are the summation components 12, 22, the main computer components 11, 21 and the summation components 15, 25. The differences $(x_A - x_M)$ and $(y_A - y_M)$ are formed in the summation components 12, 22 these differences being applied to the addition registers 11a, 21a of the main computer components 11, 21. The output value $\eta_\nu$ of the main computer component 21 is multiplied in the multiplier 31, by $(-1)$ and, in the multiplier 11b of the main computer component 11, by the factor K. The output value $\xi_\nu$ of the main computer component 11 is applied to the multiplier 21b of the main computer component 21 where it is multiplied by the factor K. With each clock pulse $t$, the values present in the multipliers 11b, 21b are added to the numbers already present in the addition registers 11a, 21a. The numbers $\xi_\nu$ and $\eta_\nu$ which have accrued in the registers are added to the coordinates $x_M$ and $y_M$ of the center in the summation components 17 and 27—the lowest-order digits which exceed the resolution made possible by the size of the raster unit being omitted—and the result is applied to the output $x_\nu$ and $y_\nu$ of the computer. The differences $(x_E - x_\nu)$ and $(y_E - y_\nu)$ are then formed in the summation components 15, 25.

Figure 3:
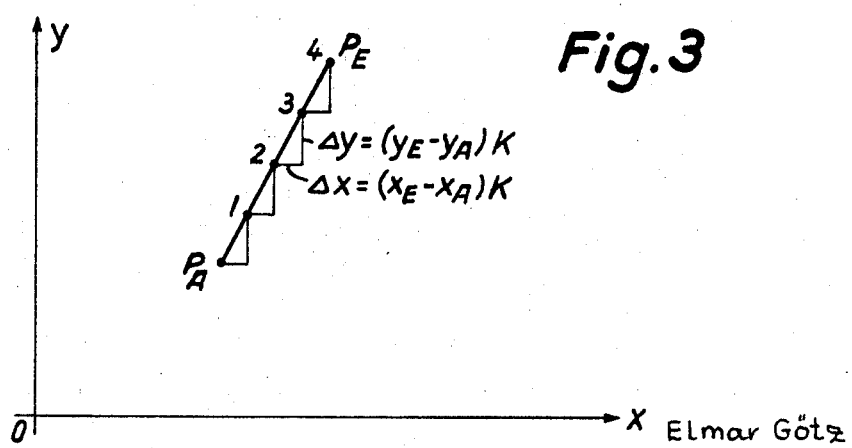
FIG. 3 is a plot showing the operation of the computer when calculating the coordinates of a rectilinear curve portion.

The internal connection and mode of operation of the computer R differs depending on whether a rectilinear or curvilinear portion is being treated. As is described more fully in the above-mentioned Pat. No. 3,109,092, when the computer calculates the coordinates of a rectilinear portion, it will traverse each rectilinear portion in the same number of steps, regardless of the length of the rectilinear portion. The number of steps will be $1/K$, where K is a characteristic constant of the computer FIG. 3 shows such a rectilinear portion which is traversed in four steps. Inasmuch as K is a constant, each rectilinear portion will, if the clock frequency $f_t$ remains constant, be traversed within the same time. This means that, at a given frequency $f_t$, the longer any particular rectilinear portion, the faster the rate at which the curve will be traversed. Thus, the feed rate can be preset to an exact amount only if all of the rectilinear portions are of the same length.

Figure 4:
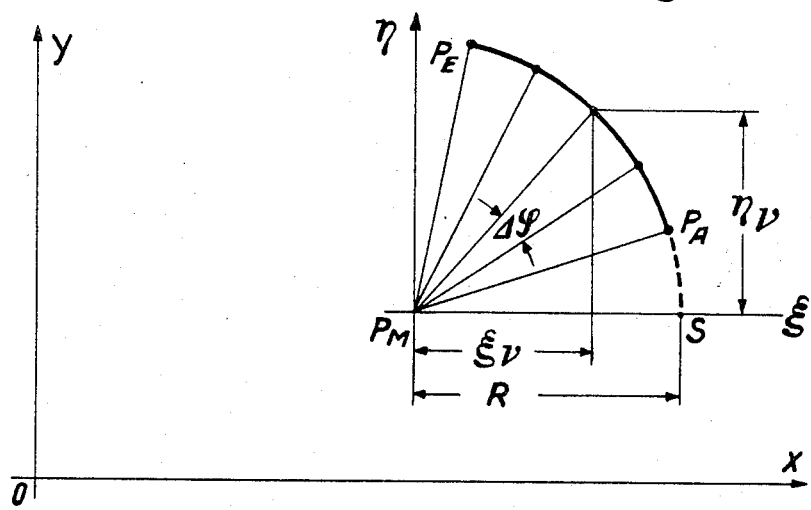
FIG. 4 is a plot showing how the computer according to the instant invention is able to calculate the radius of a circular curve portion to be traversed.

Still referring to the computer arrangement of Pat. No. 3,109,092, the same operates in such a manner that when the computer calculates the coordinates along a curvilinear portion, the number of steps, i.e., the number of calculated point, with which the portion is traversed, is no longer constant. What is constant in this case is the angle $\Delta\varphi$ formed between two radii passing through the center $P_M$ of the circular portion and, respectively, through the two points along the curve portion. The value $\Delta\varphi$ is thus equal to the computer constant K. This is shown in FIG. 4, in which the circular curve portion is represented as having a starting point $P_A$, an end point $P_E$, and a center $P_M$. This curve portion is traversed in four steps. Actually, it is not the curve which is traversed, but a polygonal approximation thereof, namely, a series of straight lines connecting the individual points along the curve. The practical difference between the true curve and its approximation is, for purposes of the present invention, of no import. Thus, with a given clock frequency $f_t$, the larger the radius of the curved portion, the higher the rate at which the curve is traversed and the poorer, i.e., smaller, the resolving power of the system. Also, it will be seen that, insofar as circular curve portions are concerned, an adjustment of the clock pulse frequency will adjust the feed rate equally only if the radii of all circular portions are equal.

It is, therefore, an object of the present invention to improve the system disclosed and claimed in Pat. No. 3,109,092 so as to overcome the above-mentioned drawbacks, namely, so that the rate at which the curve is traversed is independent of the length of rectilinear curve portions as well as independent of the radius of circular curve portions.

It is a further object of the present invention to provide an arrangement of the above-described type in which, additionally, the resolving power of the system is independent of the radius of the circular portions.

With the above objects in view, the present invention resides, basically, in the following: if only the first of the above advantages is to be achieved, namely, a system in which the curve traversal rate is independent of the length of rectilinear curve portions and of the radius of circular curve portions, but in which the resolving power is still dependent on the curvature of the curved portions, then what is done is that prior to traversing each curve portion, the length of such portion if it is rectilinear, and the radius of such portion if it is circular, is determined by the computer and the clock frequency is changed inversely proportionally to the length or radius, as the case may be, this change being in addition to any change in the frequency dictated by the desired feed rate.

For additionally obtaining a resolving power which is independent of the circular portion, what is done is that prior to traversing each curve portion, the length of a rectilinear portion or the radius of a circular portion is utilized to adjust the computer constant K to a value which is inversely proportional to the length or radius, as the case may be.

The length of a rectilinear portion of the radius of a circular portion is, according to the present invention, obtained by causing the computer to calculate a circle; in the case of a rectilinear curve portion, the circle has as its center the starting point and passes through the end point, and as soon as the value along one coordinate is zero, the value along the other coordinate is equal to the length of a rectilinear portion or the radius of a circular portion, as the case may be, which value is then fed to a storage register and used to control the clock frequency $f_t$, during the subsequent traversal of the rectilinear portion.

Figure 5:
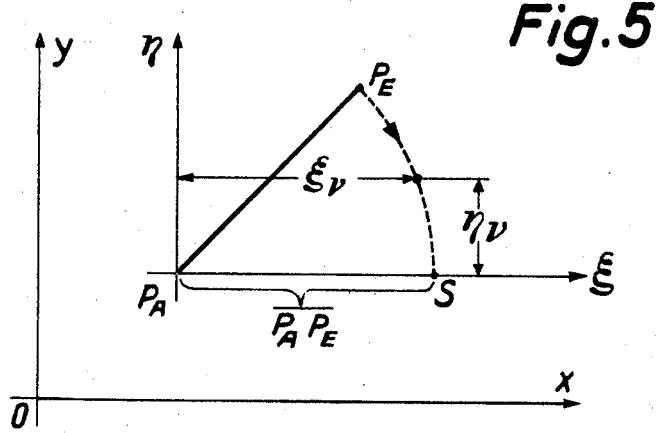
FIG. 5 is a plot showing how the computer according to the present invention is able to calculate the length of a rectilinear curve portion to be traversed.

The present invention will now be explained with reference to FIG. 5 which shows the points $P_A$ and $P_E$ of a rectilinear curve portion whose individual points are to be calculated. If this rectilinear portion is to be traversed at the desired feed rate V, then the clock frequency $f_t$ has to be adjusted so as to be inversely proportional to the distance $\overline{P_A P_E}$. Consequently, the length of the rectilinear portion has to be known. It is, of course, possible to include the length of the portion in the programming of the computer by letting this information constitute part of the characteristic curve data. This has a number of drawbacks; for one thing, the record carrier, such as the punched cards, the punched tape, the magnetic tape, etc., which feeds the characteristic data into the computer has to be larger, and, for another, it requires that the distances involved first be calculated because the shop drawings from which the program is originally derived generally will not include this information directly. Alternatively, the length may be calculated according to the Pythagorean proposition since the starting and end points are known. This, however, is too complicated. According to the present invention, the length of a rectilinear curve portion is determined by switching the computer into the position in which it calculates the coordinates of a circular curve portion and to let it compute a circle which has as its center the starting point $P_A$ and which passes through the point $P_E$ (or vice versa). The computation takes place in the direction shown by the arrow in FIG. 5.

Figure 6:
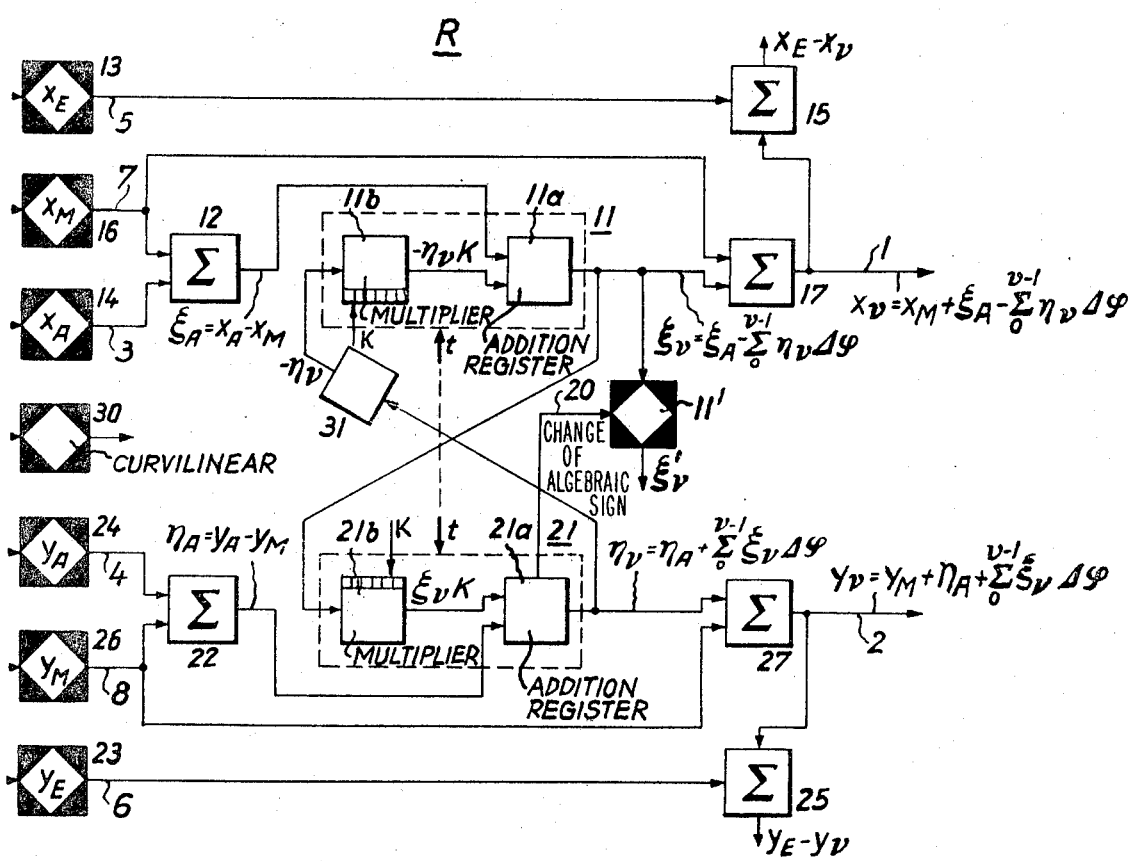
FIG. 6 shows how the computer disclosed in Pat. No. 3,109,092 may be connected for calculating the length of rectilinear of the radius of a curvilinear section.

FIG. 6 again shows the computer R as being switched to the condition in which it calculates a circular arc, the computer, however, now being so connected as to calculate the length of a rectilinear portion or the radius of a circular portion. The circuitry shown in FIG. 6 is augmented with respect to that shown in FIG. 2b only by the provision of the multiple-digit store 11′ which is controlled by the output value $\xi_v$ of the main computer component 11. The coordinates $\xi_v$ and $\eta_v$ appear at the outputs of the main computer components 11, 21. The output value $\eta_v$ is continually monitored by the main computer component 21, and the computation is interrupted as soon as the value zero appears, this occurring at point S in FIG. 5. The value $\xi_v$ which, at that instant, appears in the main computer component 11, and which is equal to the length $\overline{P_A P_E}$ to be determined, is taken over and stored by the store 11′ which, at the instant that $\eta_v=0$, is opened via the line 20 (change of algebraic sign of the main computer component 21, digital "zero" represents a plus sign and digital "one" represents a minus sign. While the machine runs through the rectilinear portion, during which time the computer is connected as shown in FIG. 2a, the store 11′ is connected via the clock T as shown in FIG. 2a, in dashed lines. The clock T itself is controlled, via its input 9, from the programmed feed rate V at which the line portion is traversed. The clock pulses $t$ control the main computer components 11, 21. The value $\xi^1$ of store 11′ acts on the clock T whose clock pulse frequency $f_t$ is influenced inversely proportionally to this value. Thus, in order to obtain a constant feed rate, the clock pulse frequency $f_t$ is always correlated to the distance between $P_A$ and $P_E$.

The radius of a curvilinear portion (FIG. 4) is similarly obtained. With the computer connected as shown in FIG. 6, the circle about $P_M$ is computed, beginning at $P_A$, until $\eta_v$ becomes zero, this occurring at point S in FIG. 4. At that instant, the value $\xi_v$ is equal to the radius to be calculated. Again, this value is applied to the store 11′ and, as shown in dashed lines in FIG. 2b, influences, inversely proportionally, the clock pulse frequency $f_t$ while the circuit calculates the curvilinear portion.

So long as the values $P_A$, $P_E$ and the radius $r$ affect only the clock pulse frequency, the resolution of the computer is not constant. Instead, the larger $\overline{P_A P_E}$ or $r$, the smaller the resolution. If, on the other hand, the value stored in the store 11′ does not influence the clock pulse frequency but the computer constant K, the resolution will no longer depend solely on the externally applied feed rate but will be constant. Here, the value K, or $\Delta\varphi$, must be influenced in such a way that K varies inversely proportionally with the value $\overline{P_A P_E}$ or $r$ stored in the store 11′. In this case, the value $\xi^1$ in store 11′ of FIG. 6, instead of influencing the clock T, influences the multipliers 11b, 21b, of the circuit arrangement shown in FIGS. 2a and 2b, as shown by the dashed line 40, in consequence of which the computer constant K, which determines the resolution, is changed.

Finally, it is also possible to combine the two above-mentioned ways, whereupon the clock frequency $f_t$ as well as the computer constant K will be varied in dependence on the known distance $\overline{P_A P_E}$ or the radius R. However, both magnitudes are not changed at the same time; instead, there are coarse adjustments in the computer K and fine adjustments in the clock frequency $f_t$. With such a combination, the feed rate or curve traversal speed is independent of the configuration of the curve portion, while the resolving power remains changeable within the limits of the fine adjustment, i.e., the resolving power does not remain absolutely constant. The combination has the advantage that a coarse adjustment of the computer K is easily carried out by very simple structural means. This is so because the computer operates in a natural binary system, so that a change in the computer constant K by a factor 2 means simply a shifting of the binary number by one position. It therefore requires no appreciable additional circuitry to obtain a coarse adjustment by a factor $2^n$, where $n$ is an integer.

In the arrangement shown in Pat. No. 3,109,092, the computation of the coordinates of one curve portion is terminated and replaced directly by the computation of the coordinates of the next curve portion. For obtaining a constant feed rate and/or a constant resolving power, as described above, the length of the next rectilinear curve portion, or the radius of the next circular portion, as described above, the length of the next rectilinear ordinates of the points along this next curve portion are computed. To do this, it would be possible to use an additional computer which operates in the same manner as the basic computer used in the arrangement of Pat. No. 3,109,092, but this would be too expensive. In order to avoid this drawback, the same computer is used for alternately calculating (a) the coordinates of the curve portion being traversed, and (b) the lengths of rectilinear curve portions or the radii of circular curve portions which are to be traversed. Here, the last-mentioned operation will be carried out at a substantially higher clock frequency $f_t$; in this way, the time required for carrying out the computations under (b) will, for all practical purposes, not interrupt the continuous output of coordinates of the entire curve.

It will thus be seen that the present invention includes a computer for calculating the coordinates of a curve which includes rectilinear and circular curve portions, which computer incorporates, basically, some or all of the following elements: firstly, a variable frequency clock for controlling the computer; secondly, means for adjusting the computer constant of the computer; thirdly, means for calculating, prior to the time a given curve portion is traversed, the length of such curve portion if it is rectilinear or the radius of such curve portion if it is circular; and fourthly, mean interconnecting the calculating means with both the clock and the adjusting means for adjusting the frequency of the clock and the computer constant by factors which are inversely proportional to the length or radius, as the case may be, of the curve portion to be traversed. The clock is caused to deliver a substantially higher frequency during the calculation of the length or radius of a curve portion than during the calculation of the coordinates of the points along the curve; furthermore, the arrangement is such that the clock is finely adjustable and the computer constant adjusting means coarsely adjustable. Finally, the calculating means per se include means for calculating a circle which, in the case of a rectilinear curve portion, has its center at one end of the curve portion and which passes through the other end, and, which, in the case of a circular curve portion, has its center at the center of such circular portion and which passes through a point on the circular curve portion (or vice versa), and means for stopping the calculation when one of the coordinate values relative to the center of the circle is zero, at which instant the value along the other coordinate represents the length of the curve portion if it is rectilinear or the radius of the curve portion if it is circular.

It will be understood that the above description of the present invention is susceptible to various modifications, changes and adaptations, and the same are intended to be comprehended within the meaning and range of equivalents of the appended claims.

We claim:

1. A computer for calculating the coordinates of a curve which includes rectilinear and/or circular curve portions, characterized by the combination of:
   (a) a variable-frequency clock for controlling the computer;
   (b) means for adjusting the computer constant of the computer;
   (c) means for calculating, prior to the time a given curve portion is traversed, the length of such curve portion if it is rectilinear or the radius of such curve portion if it is circular; and
   (d) means interconnecting said calculating means
       (1) with said clock for adjusting the frequency thereof and
       (2) with said adjusting means for causing the latter to adjust the computer
   by respective factors which are inversely proportional to the length or radius, as the case may be, of the curve portion to be traversed.

2. The combination defined in claim 1 wherein said calculating means comprise:
   (i) means for calculating a circle which, in the case of a rectilinear curve portion, has its center at one end of the curve portion and which passes through the other end, and which, in the case of a circular curve portion, has its center at the center of such circular portion and which passes through a point on the circular curve portion, or vice versa; and
   (ii) means for stopping the calculation when one of the coordinate values relative to the center of the circle is zero, at which instant the value along the other coordinate represents the length of the curve portion if it is rectilinear or the radius of the curve portion if it is circular.

3. The combination defined in claim 1, further comprising means for causing said clock to deliver a substantially higher frequency during the calculation of the length or radius of a curve portion than during the calculation of the coordinates of the points along the curve.

4. The combination defined in claim 1 wherein said clock is coarsely adjustable and said computer constant adjusting means are finely adjustable.

5. A computer for calculating the coordinates of a curve which includes rectilinear and/or circular curve portions, characterized by the combination of
   (a) a variable-frequency clock for controlling the computer,
   (b) means for calculating, prior to the time a given curve portion is traversed, the length of such curve portion if it is rectilinear or the radius of such curve portion if it is circular; and
   (c) means interconnecting said calculating means with said clock for adjusting the frequency thereof by a factor which is inversely proportional to the length or radius, as the case may be, of the curve portion to be traversed.

6. The combination defined in claim 5, wherein said calculating means comprise:
   (i) means for calculating a circle which, in the case of a rectilinear curve portion, has its center at one end of the curve portion and which passes through the other end, and which, in the case of a circular curve portion, has its center at the center of such circular portion and which passes through a point on the circular curve portion, or vice versa; and
   (ii) means for stopping the calculation when one of the coordinate values relative to the center of the circle is zero, at which instant the value along the the other coordinate represents the length of the curve portion if it is rectilinear or the radius of the curve portion if it is circular.

7. The combination defined in claim 5, further comprising means for causing said clock to deliver a substantially higher frequency during the calculation of the length or radius of a curve portion than during the calculation of the coordinates of the points along the curve.

8. A computer for calculating the coordinates of a curve which includes rectilinear and/or circular curve portions, characterized by the combination of:
   (a) means for adjusting the computer constant of the computer;
   (b) means for calculating, prior to the time a given curve portion is traversed, the length of such curve portion if it is rectilinear or the radius of such curve portion if it is circular; and 9. The combination defined in claim 8, wherein said calculating means comprises:
   (i) means for calculating a circle which, in the case of a rectilinear curve portion, has its center at one end of the curve portion and which passes through the other end, and which, in the case of a circular curve portion, as its center at the center of such circular portion and which passes through a point on the circular curve portion, or vice versa; and
   (ii) means for stopping the calculation when one of the coordinate values relative to the center of the circle is zero, at which instant the value along the other coordinate represents the length of the curve portion if it is rectilinear or the radius of the curve portion if it is circular.

References Cited

UNITED STATES PATENTS

| | | | |
|---|---|---|---|
| 3,254,203 | 5/1966 | Kveim | 235—152 |
| 3,256,424 | 6/1966 | Götz | 235—152 X |
| 3,109,092 | 10/1963 | Lott et al. | 235—151.11 X |
| 3,069,608 | 12/1962 | Forrester et al. | 235—151.11 X |

MALCOLM A. MORRISON, Primary Examiner

D. H. MALZAHN, Assistant Examiner

U.S. Cl. X.R.

235—152, 151.1